(12) United States Patent
La Frese et al.

(10) Patent No.: US 8,055,868 B2
(45) Date of Patent: Nov. 8, 2011

(54) APPARATUS AND METHOD TO STORE ORIGINAL POINT-IN-TIME DATA

(75) Inventors: Lee Charles La Frese, Tucson, AZ (US); Christopher Michael Sansone, Tucson, AZ (US); Dana Fairbairn Scott, Tucson, AZ (US); Olga Yiparaki, Tucson, AZ (US); Yan Xu, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 753 days.

(21) Appl. No.: 12/182,059

(22) Filed: Jul. 29, 2008

(65) Prior Publication Data

US 2010/0030956 A1    Feb. 4, 2010

(51) Int. Cl.
     *G06F 12/00*      (2006.01)
(52) U.S. Cl. ........ 711/162; 711/112; 711/114; 711/156; 711/158; 707/639; 707/649; 707/655
(58) Field of Classification Search .................. 711/162, 711/112, 114, 156, 158; 707/639, 649, 655
See application file for complete search history.

(56) References Cited

U.S. PATENT DOCUMENTS

| | | | |
|---|---|---|---|
| 6,349,356 B2 | 2/2002 | Basham et al. | |
| 6,628,672 B1 | 9/2003 | Cabello | |
| 6,857,018 B2 | 2/2005 | Jiang | |
| 7,249,227 B1 | 7/2007 | Pittman | |
| 7,647,357 B2 * | 1/2010 | Bartfai et al. | 707/808 |
| 7,660,955 B2 * | 2/2010 | Jean-Denis et al. | 711/162 |
| 7,725,671 B2 * | 5/2010 | Prahlad et al. | 711/162 |
| 7,783,850 B2 * | 8/2010 | Vu et al. | 711/162 |
| 7,937,393 B2 * | 5/2011 | Prahlad et al. | 707/741 |
| 2005/0276511 A1 | 12/2005 | Jeffrey et al. | |
| 2008/0086608 A1 * | 4/2008 | Kano | 711/162 |

\* cited by examiner

*Primary Examiner* — Stephen Elmore
(74) *Attorney, Agent, or Firm* — Dale F. Regelman; Quarles & Brady LLP

(57) ABSTRACT

A method to store point-in-time data, comprising establishing a block size, providing source data storage comprising (S) blocks, and target data storage comprising (T) blocks. The method configures (B) source storage segments and (B) target storage segments, and receives updated point-in-time data for original point-in-time data written to an (i)th source storage segment. The method then determines if a (j)th target storage segment comprises available storage capacity to store the original point-in-time data. If a (j)th target storage segment comprises available storage capacity to store the original point-in-time data, the method writes the original point-in-time data to that (j)th target storage segment.

25 Claims, 16 Drawing Sheets

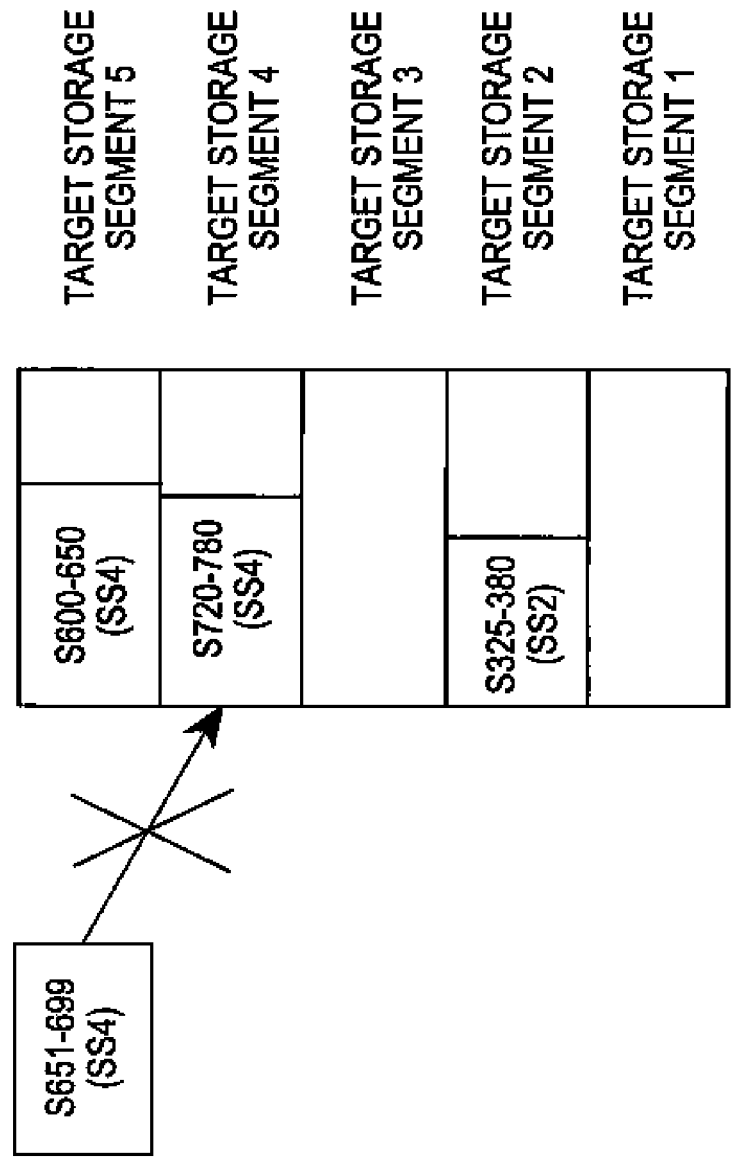

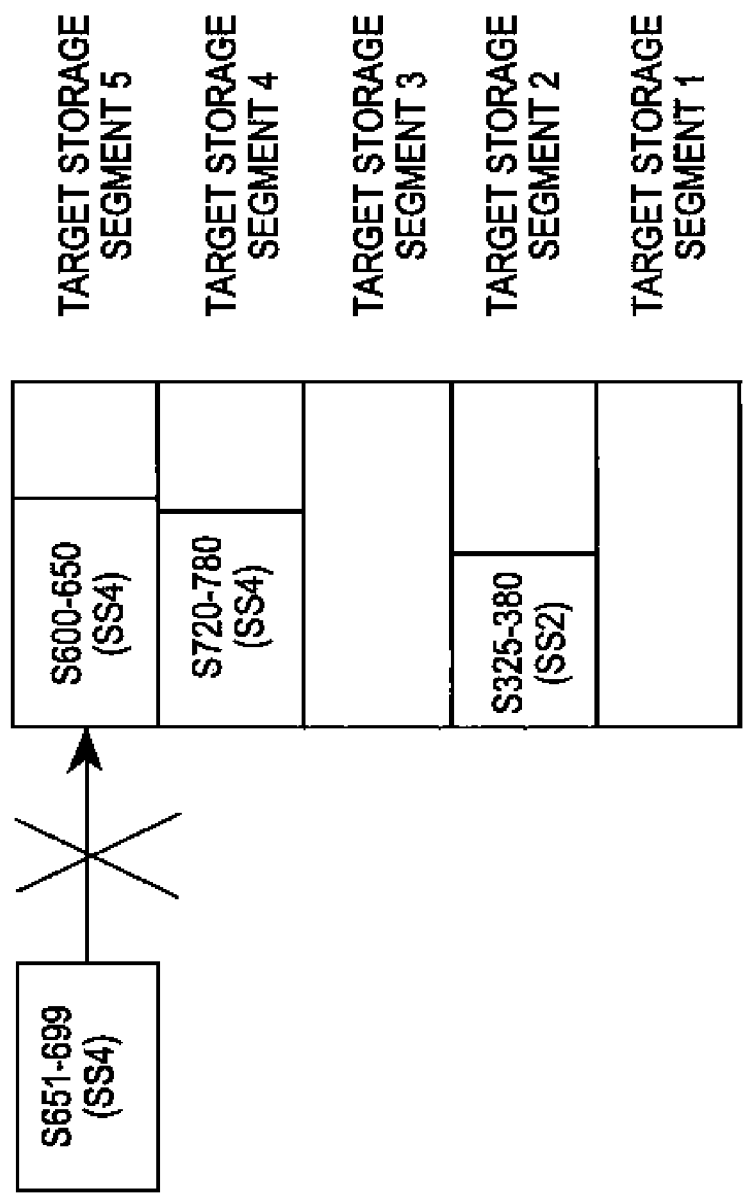

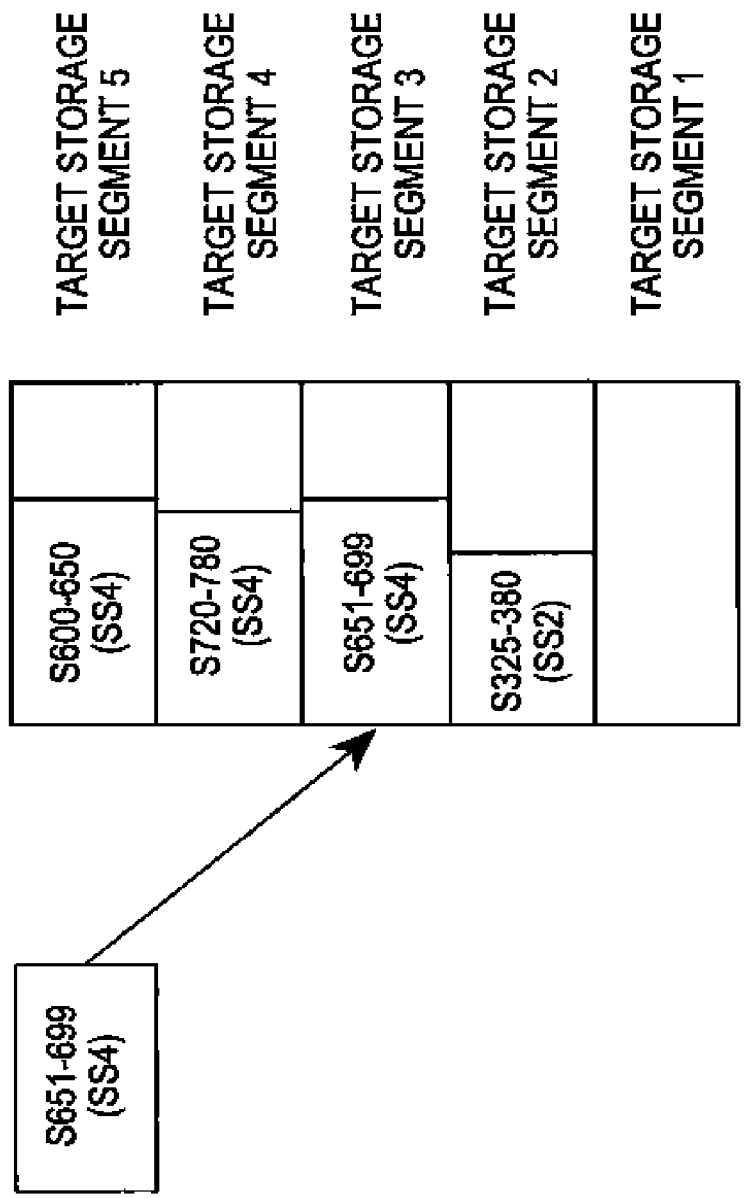

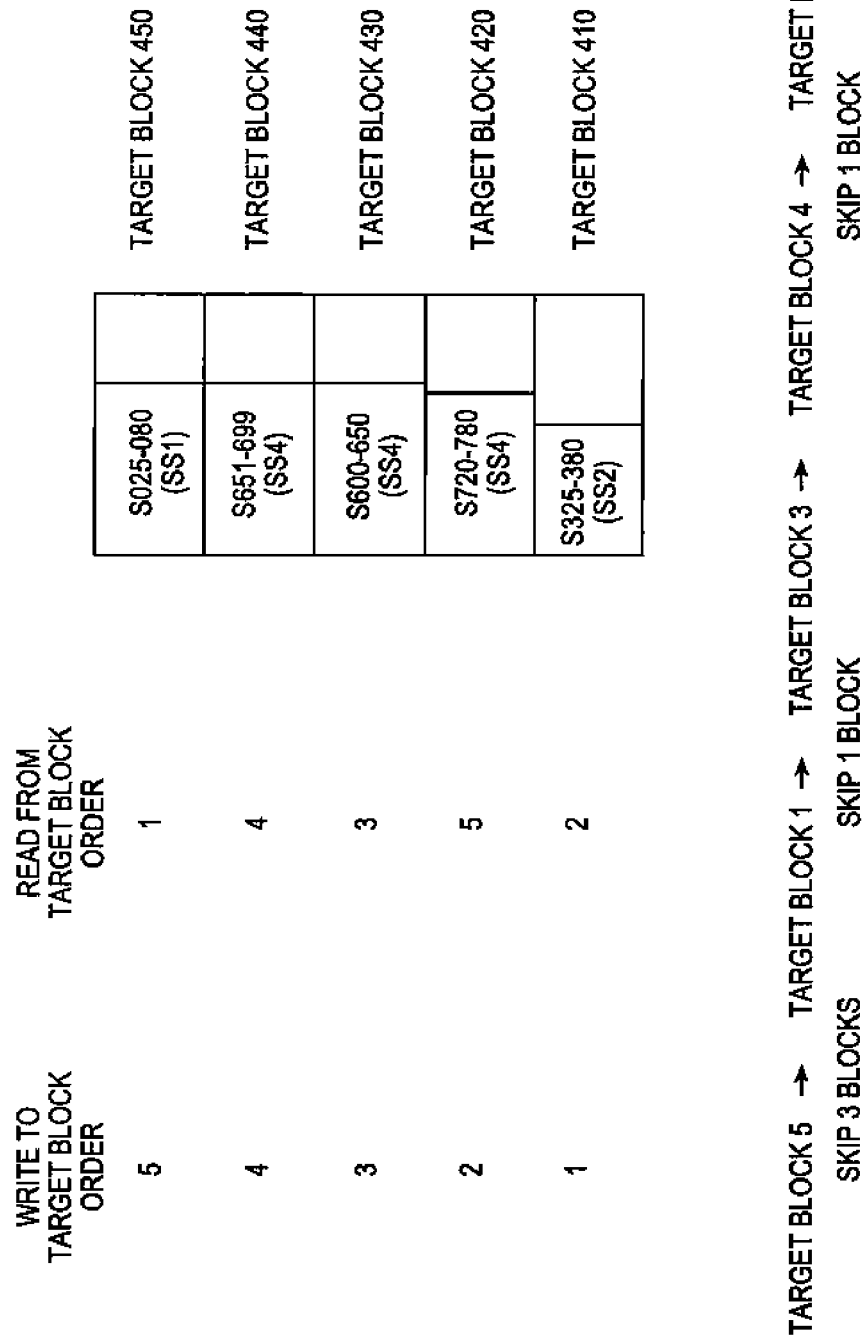

APPARATUS AND METHOD TO STORE ORIGINAL POINT-IN-TIME DATA

FIELD OF THE INVENTION

The present invention relates generally to an apparatus and method to store original point-in-time data.

BACKGROUND OF THE INVENTION

Data storage systems are used to store information provided by one or more host computer systems. Such data storage systems receive requests to write information to a plurality of data storage devices and requests to retrieve information from that plurality of data storage devices.

Point-in-time ("PIT") data comprises data generated at a specified time. When portions of such point-in-time data are updated later, the original point-in-time data is first copied to target data storage before that original PIT data is updated. This procedure preserves the original PIT data. If the original PIT data is updated in a random order, then using prior art methods the original PIT data to be updated is written to the target storage in a similar random order.

SUMMARY OF THE INVENTION

Applicants' invention comprises a method to store point-in-time data. The method establishes a block size, provides source data storage comprising (S) blocks and target data storage comprising (T) blocks, wherein (T) is less than (S), and configures (B) source storage segments and (B) target storage segments, wherein each source storage segment comprises [(S)/(B)] blocks, and wherein each target storage segment comprises [(T)/(B)] blocks.

The method receives updated point-in-time data for original point-in-time data written to an (i)th source storage segment, sets (j) equal to (i), and determines if a (j)th target storage segment comprises available storage capacity to store the original point-in-time data. If the (j)th target storage segment comprises available storage capacity to store the original point-in-time data, the method writes the original point-in-time data to the (j)th target storage segment.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 10A illustrates a portion of a fourth example using Applicants' method;

FIG. 10B illustrates a portion of the fourth example using Applicants' method;

FIG. 10C illustrates a portion of the fourth example using Applicants' method;

FIG. 13 illustrates a subsequent read operation of original PIT data copied to target storage in examples 1, 2, 3, 4, and 5 using prior art methods.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 5:
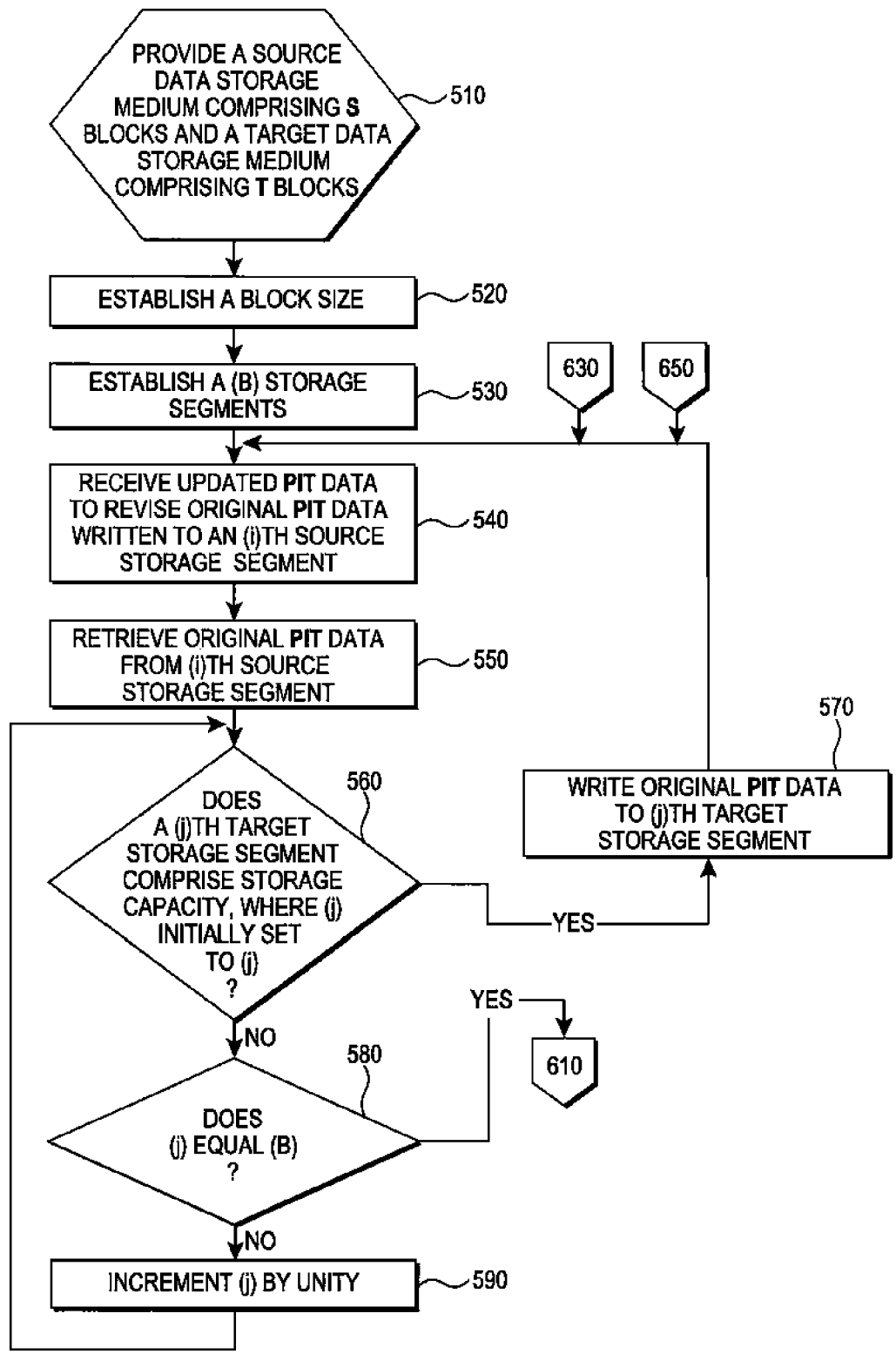
FIG. 5 is a flow chart summarizing certain steps of Applicants' method.
Figure 6:
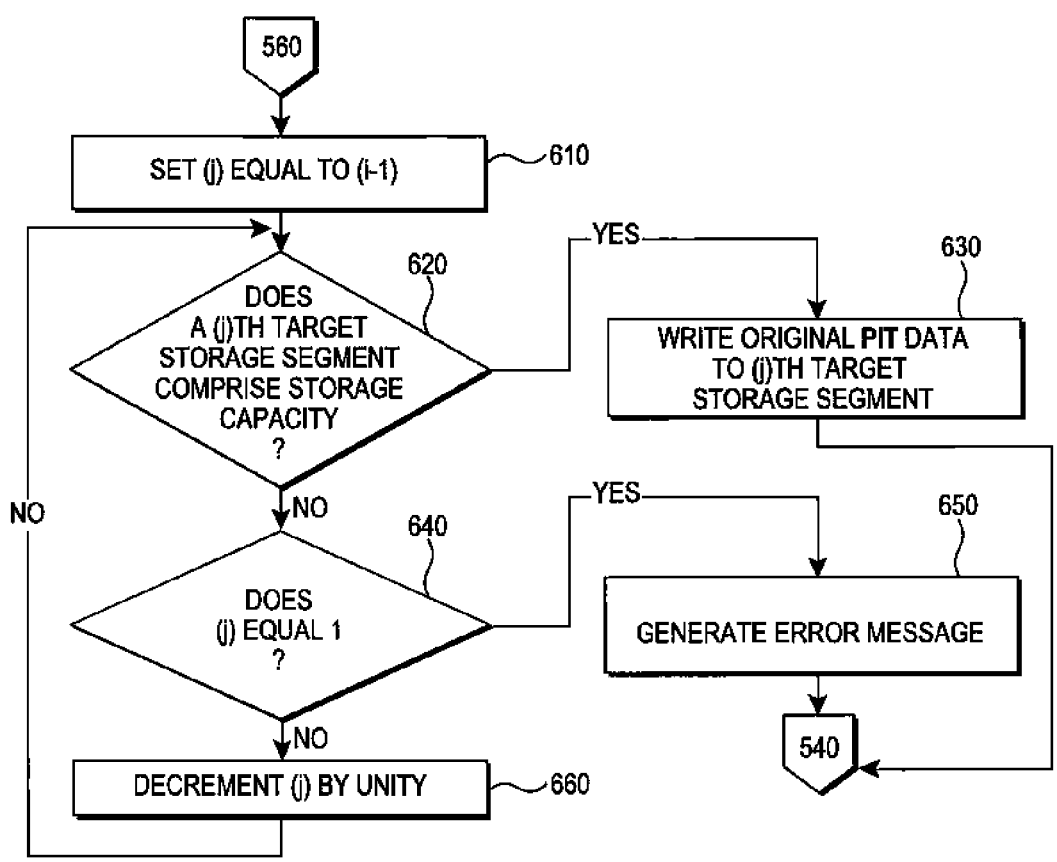
FIG. 6 is a flow chart summarizing additional steps of Applicants' method.

The schematic flow chart diagrams included herein are generally set forth as logical flow-chart diagrams (e.g., FIGS. 5 and 6). As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method (e.g., FIGS. 5 and 6). Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 2:
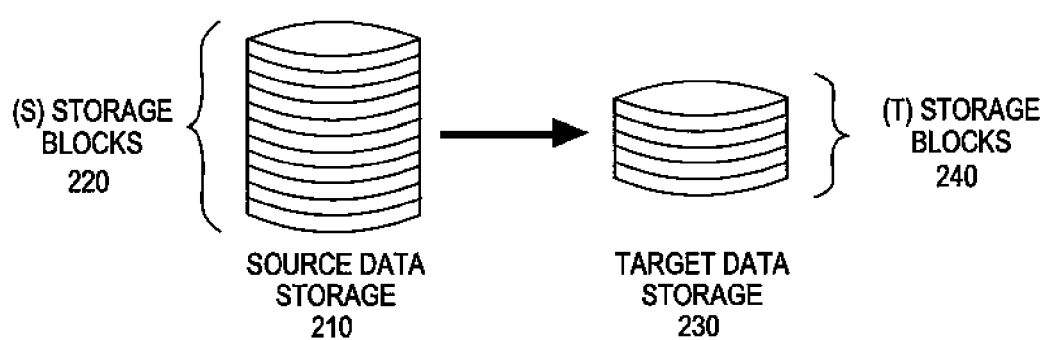
FIG. 2 shows a source data storage for point-in-time data and target data storage, wherein updated original point-in-time data is copied from the source data storage to the target data storage prior to being updated in the source data storage.

Referring to FIG. 2, point-in-time ("PIT") data written to source data storage 220 comprises data generated at a specified time. When portions of such original PIT data are updated later, the original PIT data is first copied to target data storage 230 before being updated. This procedure preserves the original PIT data.

In certain embodiments, Applicants' method utilizes a thinly provisioned point-in-time copy procedure wherein the method only allocates an amount of target storage that is required to copy original PIT data being updated. Applicants' method writes the original PIT data being updated to the target storage in a pseudo-ordered sequence. Later sequential reads of this pseudo-ordered original PIT data require reduced seek distances and times when compared to prior art point-in-time data copy methods.

FIG. 5 summarizes the initial steps in Applicants' method. Referring now to FIG. 5, in step 510 the method provides source data storage comprising original PIT data, and target data storage, wherein original PIT data to be updated will first be copied from the source data storage to the target data storage. In step 520, the method establishes a block size, wherein that block size comprises a plurality of storage addresses. In certain embodiments, the block size of step 520 comprises a specified number of blockids. In certain embodiments, the block size of step 520 comprises a specified number of track numbers. In certain embodiments, the block size of step 520 comprises a specified number of individual storage blocks.

In certain embodiments, step 520 is performed by a controller disposed in a storage library comprising the source data storage. In certain embodiments, step 520 is performed by a controller disposed in a storage library comprising the target data storage. In certain embodiments, step 520 is performed by host computer in communication with a storage library comprising the source data storage. In certain embodiments, step 520 is performed by host computer in communication with a storage library comprising the target data storage.

For example, FIG. 2 shows source data storage 210 and target data storage 230, wherein source data storage 210 comprises (S) storage blocks 220 and wherein target data storage 230 comprises (T) storage blocks 240. In the illustrated embodiment of FIG. 2, source storage blocks 220 in the aggregate comprise a greater storage capacity than do target storage blocks 240.

In certain embodiments, both source data storage 210 and target data storage 230 are disposed in the same data storage library. In certain embodiments, source data storage 210 and target data storage 230 are disposed in different data storage libraries. In certain embodiments, source data storage is selected from the group consisting of one or more magnetic information storage media, one or more optical information storage media, one or more electronic information storage media, and one or more holographic data storage media. In certain embodiments, source data storage comprises one or more first information storage media and target data storage comprises one or more second information storage media, wherein the first information storage media differ in type from the second information storage media, i.e. magnetic disk and magnetic tape.

Figure 1:
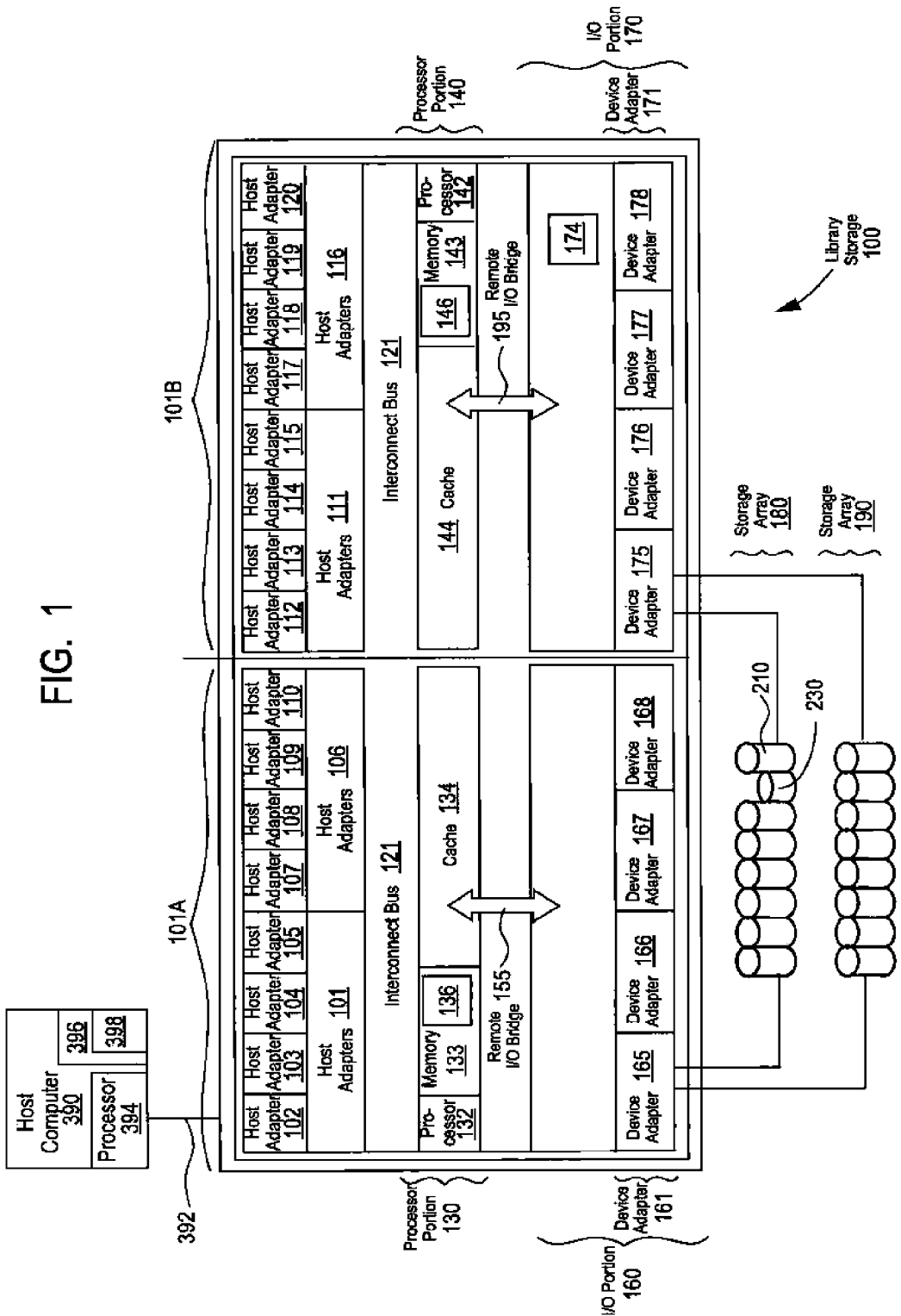
FIG. 1 is a block diagram illustrating one embodiment of Applicants' storage library comprising two clusters.

Referring now to FIG. 1, in certain embodiments source data storage 210 and target data storage 230 are disposed in a data storage library, such as data storage library 100 (FIG. 1), in communication with one or more host computers, such as host computer 390 (FIG. 1). In the illustrated embodiment of FIG. 1, data storage library 100 comprises a first cluster 101A and a second cluster 101B, wherein clusters 101A and 101B are disposed in the same housing. In the illustrated embodiment of FIG. 1, data storage system 100 comprises a plurality of host adapters 102-105, 107-110, 112-115, and 117-120, disposed in four host bays 101, 106, 111, and 116. In other embodiments, Applicants' data storage system includes fewer than 16 host adapters. Regardless of the number of host adapters disposed in any embodiments of Applicants' system, each of those host adapters comprise a shared resource that has equal access to both central processing/cache elements 130 and 140.

Each host adapter may comprise one or more Fibre Channel ports, one or more FICON ports, one or more ESCON ports, or one or more SCSI ports. Each host adapter is connected to both clusters 101A and 101B through interconnect bus 121 such that each cluster can handle I/O from any host adapter, and such that the storage controller portion of either cluster can monitor the communication path error rate for every communication path, physical and/or logical, interconnected with data storage system 100.

Storage controller portion 130 includes processor 132 and cache 134. In certain embodiments, storage controller portion 130 further includes computer readable medium 133. In certain embodiments, computer readable medium 133 comprises random access memory. In certain embodiments, computer readable medium 133 comprises non-volatile memory.

Storage controller portion 140 includes processor 142 and cache 144. In certain embodiments, storage controller portion 140 further includes computer readable medium 143. In certain embodiments, computer readable medium 143 comprises random access memory. In certain embodiments, computer readable medium 143 comprises non-volatile memory.

I/O portion 160 comprises a plurality of device adapters, such as device adapters 165, 166, 167, and 168. I/O portion 170 further comprises a plurality of device adapters, such as device adapters 175, 176, 177, and 178.

In certain embodiments of Applicants' system, one or more host adapters, storage controller portion 130, and one or more device adapters, are packaged together on a single card disposed in Applicants' data storage system. Similarly, in certain embodiments, one or more host adapters, storage controller portion 140, and one or more device adapters, are disposed on another card disposed in Applicants' data storage system. In these embodiments, Applicants' data storage library 100 includes two cards interconnected with a plurality of data storage devices.

Referring once again to FIG. 5, in step 530 the method establishes (B) storage segments, wherein (B) is greater than or equal to 2 and less than or equal to (T). In certain embodiments, step 530 is performed by a controller disposed in a storage library comprising the source data storage. In certain embodiments, step 530 is performed by a controller disposed in a storage library comprising the target data storage. In certain embodiments, step 530 is performed by host computer in communication with a storage library comprising the source data storage. In certain embodiments, step 530 is performed by host computer in communication with a storage library comprising the target data storage.

Figure 3:
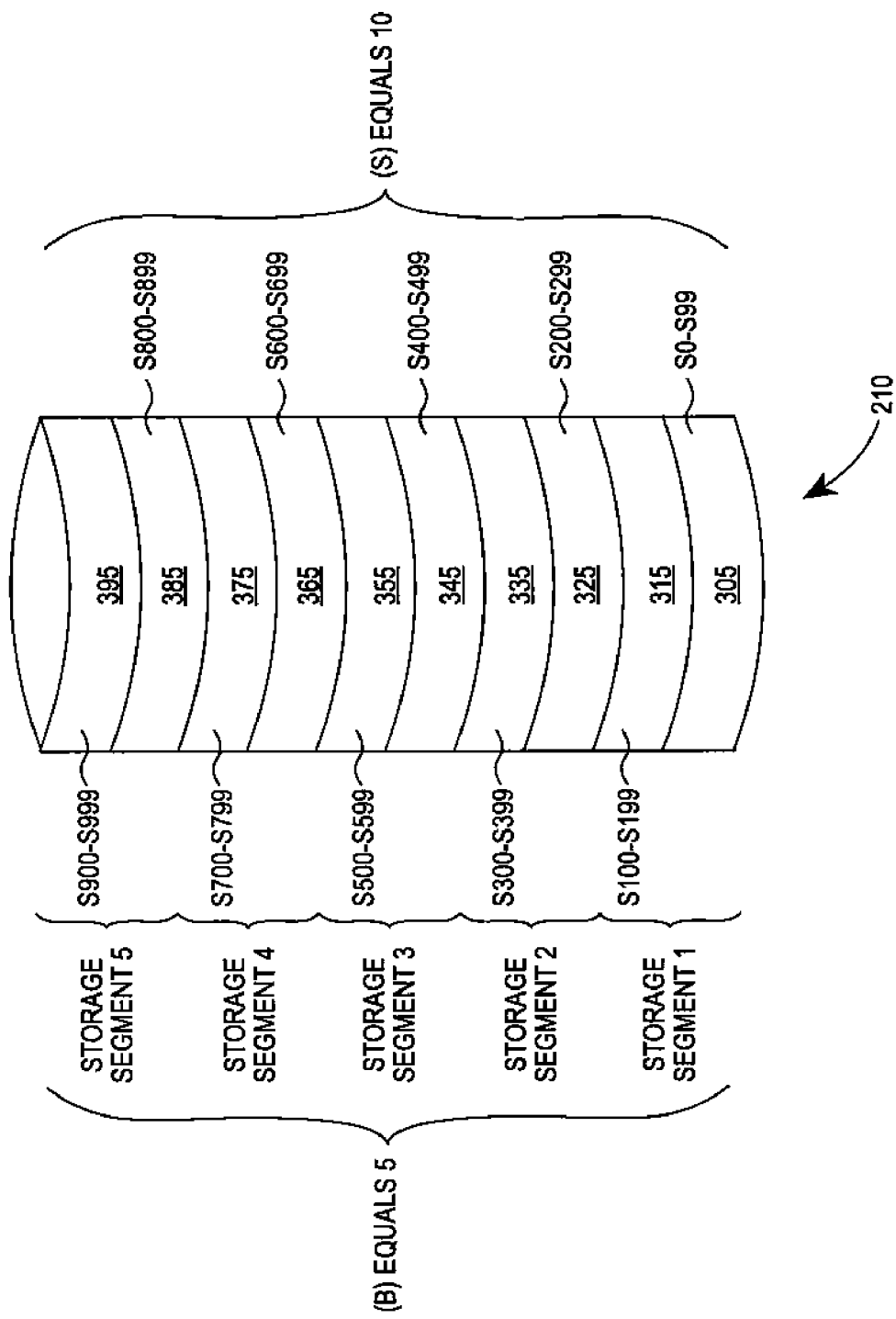
FIG. 3 illustrates the source data storage of FIG. 2 configured to comprise 5 storage segments.

For example, in the illustrated embodiment of FIG. 3 source data storage 210 is shown comprising 10 storage blocks, namely source storage blocks 305, 315, 325, 335, 345, 355, 365, 375, 385, and 395. Further in the illustrated embodiment of FIG. 3, storage addresses S0 through S99 reside in storage block 305. Similarly, storage addresses S100 through S199, S200 through S299, S300 through S399, S400 through S499, S500 through S599, S600 through S699, S700 through S799, S800 through S899, and S900 through S999, reside in source storage blocks 315, 325, 335, 345, 355, 365, 375, 385, and 395, respectively.

Further in the illustrated embodiment of FIG. 3, the number (B) of storage segments has been set to 5. Source storage segment 1 comprises source storage blocks 305 and 315. Similarly, source storage segments 2, 3, 4, and 5, comprises source storage blocks 325/335, 345/355, 365/375, and 385/395, respectively.

Figure 4:
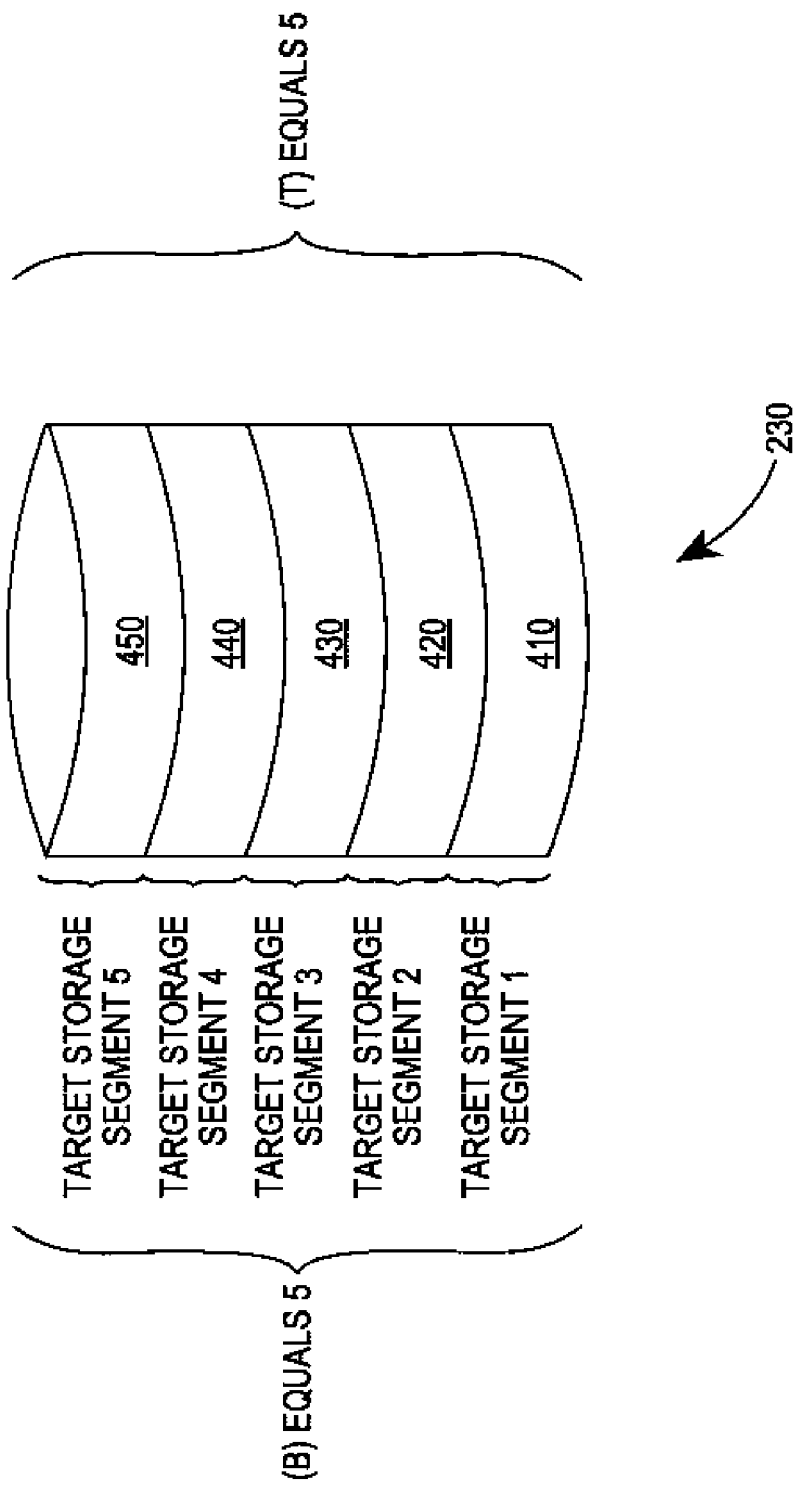
FIG. 4 illustrates the target data storage of FIG. 2 configured to comprise 5 storage segments.

In the illustrated embodiment of FIG. 4, target data storage 230 is shown comprising 5 storage blocks, namely target storage blocks 410, 420, 430, 440, and 450. The storage capacity of each target storage block is the same, and the storage capacity of each target storage block equals the storage capacity of each source storage block.

Further in the illustrated embodiment of FIG. 4, target data storage 230 is shown comprising 5 target storage segments. Target storage segment 1 comprises target storage block 410. Similarly, target storage segments 2, 3, 4, and 5, comprise target storage blocks 420, 430, 440, and 450, respectively.

Referring once again to FIG. 5, in step 540 the method receives updated point-in-time PIT data to be written to one or more storage addresses located in an (i)th storage segment. In certain embodiments, the updated PIT data of step 540 is received by a data storage library, such as data storage library 100, comprising the source data storage and/or the target data storage. In certain embodiments, the updated PIT data of step 540 is generated and provided by a host computer, such as host computer 390 (FIG. 1), in communication with a data storage library comprising the source data storage and/or the target data storage.

In step 550, the method retrieves original PIT data from the source data storage, wherein that original PIT data will be revised with the updated PIT data of step 540. In certain embodiments, step 550 is performed by a controller disposed in a storage library comprising the source data storage. In certain embodiments, step 550 is performed by a controller disposed in a storage library comprising the target data storage. In certain embodiments, step 550 is performed by host computer in communication with a storage library comprising the source data storage. In certain embodiments, step 550 is performed by host computer in communication with a storage library comprising the target data storage.

In step 560, the method determines if a (j)th target storage segment comprises storage capacity to encode the original PIT data retrieved from an (i)th source storage segment in step 550, wherein (j) is initially set to (i). In certain embodiments, step 560 is performed by a controller disposed in a storage library comprising the source data storage. In certain embodiments, step 560 is performed by a controller disposed in a storage library comprising the target data storage. In certain embodiments, step 560 is performed by host computer in communication with a storage library comprising the source data storage. In certain embodiments, step 560 is performed by host computer in communication with a storage library comprising the target data storage.

If the method determines in step 560 that a (j)th target storage segment comprises storage capacity to encode original PIT data retrieved from an (i)th source storage segment in step 550, then the method transitions from step 560 to step 570 wherein the method encodes in a (j)th target data storage the original PIT data retrieved from an (i)th source storage segment in step 550. The method transitions from step 570 to step 540 and continues as described herein.

In certain embodiments, step 570 is performed by a controller disposed in a storage library comprising the source data storage. In certain embodiments, step 570 is performed by a controller disposed in a storage library comprising the target data storage. In certain embodiments, step 570 is performed by host computer in communication with a storage library comprising the source data storage. In certain embodiments, step 570 is performed by host computer in communication with a storage library comprising the target data storage.

If the method determines in step 560 that a (j)th target storage segment does not comprise storage capacity to encode original PIT data retrieved from an (i)th source storage segment in step 550, then the method transitions from step 560 to step 580 wherein the method determines if (j) equals (B). In certain embodiments, step 580 is performed by a controller disposed in a storage library comprising the source data storage. In certain embodiments, step 580 is performed by a controller disposed in a storage library comprising the target data storage. In certain embodiments, step 580 is performed by host computer in communication with a storage library comprising the source data storage. In certain embodiments, step 580 is performed by host computer in communication with a storage library comprising the target data storage.

If the method determines in step 580 that (i) equals (B), then the method transitions from step 580 to step 610 (FIG. 6). Alternatively, if the method determines in step 580 that (i) does not equal (B), then the method transitions from step 580 to step 590 wherein the method increments (i) by unity. The method transitions from step 590 to step 560 and continues as described herein.

In certain embodiments, step 590 is performed by a controller disposed in a storage library comprising the source data storage. In certain embodiments, step 590 is performed by a controller disposed in a storage library comprising the target data storage. In certain embodiments, step 590 is performed by host computer in communication with a storage library comprising the source data storage. In certain embodiments, step 590 is performed by host computer in communication with a storage library comprising the target data storage.

Referring now to FIG. 6, in step 610 the method sets (j) equal to (i−1). In certain embodiments, step 610 is performed by a controller disposed in a storage library comprising the source data storage. In certain embodiments, step 610 is performed by a controller disposed in a storage library comprising the target data storage. In certain embodiments, step 610 is performed by host computer in communication with a storage library comprising the source data storage. In certain embodiments, step 610 is performed by host computer in communication with a storage library comprising the target data storage.

In step 620, the method determines if a (j)th target storage segment comprises storage capacity to encode the original PIT data retrieved from an (i)th source storage segment in step 550. In certain embodiments, step 620 is performed by a controller disposed in a storage library comprising the source data storage. In certain embodiments, step 620 is performed by a controller disposed in a storage library comprising the target data storage. In certain embodiments, step 620 is performed by host computer in communication with a storage library comprising the source data storage. In certain embodiments, step 620 is performed by host computer in communication with a storage library comprising the target data storage.

If the method determines in step 620 that a (j)th target storage segment comprises storage capacity to encode original PIT data retrieved from an (i)th source storage segment in step 550, then the method transitions from step 620 to step 630 wherein the method encodes in a (j)th target data storage segment the original PIT data retrieved from an (i)th source storage segment in step 550. The method transitions from step 630 to step 540 and continues as described herein.

In certain embodiments, step 630 is performed by a controller disposed in a storage library comprising the source data storage. In certain embodiments, step 630 is performed by a controller disposed in a storage library comprising the target data storage. In certain embodiments, step 630 is performed by host computer in communication with a storage library comprising the source data storage. In certain embodiments, step 630 is performed by host computer in communication with a storage library comprising the target data storage.

If the method determines in step 620 that a (j)th target storage segment does not comprise storage capacity to encode original PIT data retrieved from an (i)th source storage segment in step 550, then the method transitions from step 620 to step 640 wherein the method determines if (j) equals (1). In certain embodiments, step 640 is performed by a controller disposed in a storage library comprising the source data storage. In certain embodiments, step 640 is performed by a controller disposed in a storage library comprising the target data storage. In certain embodiments, step 640 is performed by host computer in communication with a storage library comprising the source data storage. In certain embodiments, step 640 is performed by host computer in communication with a storage library comprising the target data storage.

If the method determines in step 640 that (i) equals (1), then the method transitions from step 640 to step 650 wherein the method generates an error message. The method transitions from step 650 to step 540 and continues as described herein.

In certain embodiments, the error message of step 650 is provided to a host computer in communication with a storage library comprising the source data storage. In certain embodiments, the error message of step 650 is provided to a host computer in communication with a storage library comprising the target data storage. In certain embodiments, the error message of step 650 is provided to a host computer that provided the update PIT data of step 540.

Alternatively, if the method determines in step 640 that (j) does not equal 1, then the method transitions from step 640 to step 660 wherein the method decrements (j) by unity. The method transitions from step 660 to step 620 and continues as described herein.

In certain embodiments, step 590 is performed by a controller disposed in a storage library comprising the source data storage. In certain embodiments, step 590 is performed by a controller disposed in a storage library comprising the target data storage. In certain embodiments, step 590 is performed by host computer in communication with a storage library comprising the source data storage. In certain embodiments, step 590 is performed by host computer in communication with a storage library comprising the target data storage.

The following Examples are presented to further illustrate to persons skilled in the art how to implement the method of FIGS. 5 and 6. These Examples are not intended as limitations, however, upon the scope of the invention.

EXAMPLE I

Figure 7:
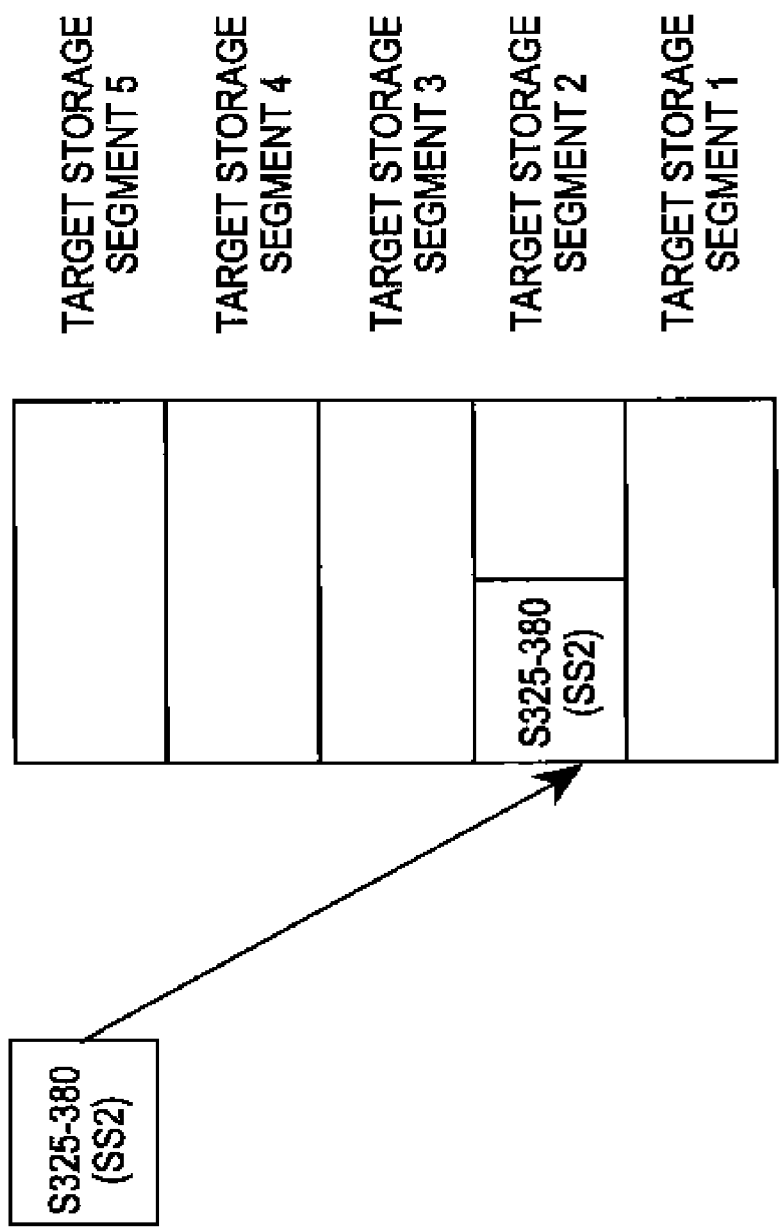
FIG. 7 illustrates a first example using Applicants' method.

Referring now to FIG. 7, in step 540 the method receives updated PIT data that will be used to revise original PIT data encoded at storage addresses S325-S380. Referring to FIG. 3, storage addresses S325-S380 are located in source storage block 335, and source storage block 335 is configured in Source Storage Segment 2. Therefore, (i) equals 2.

In step 560, the method determines if Target Storage Segment 2 comprises sufficient storage capacity to store the original PIT data encoded at storage addresses S325-S380. Having determined that Target Storage Segment 2 does comprise sufficient storage capacity, FIG. 7 shows the original PIT data encoded at storage addresses S325-S380 being copied in step 570 to Target Storage Segment 2.

EXAMPLE II

Figure 8:
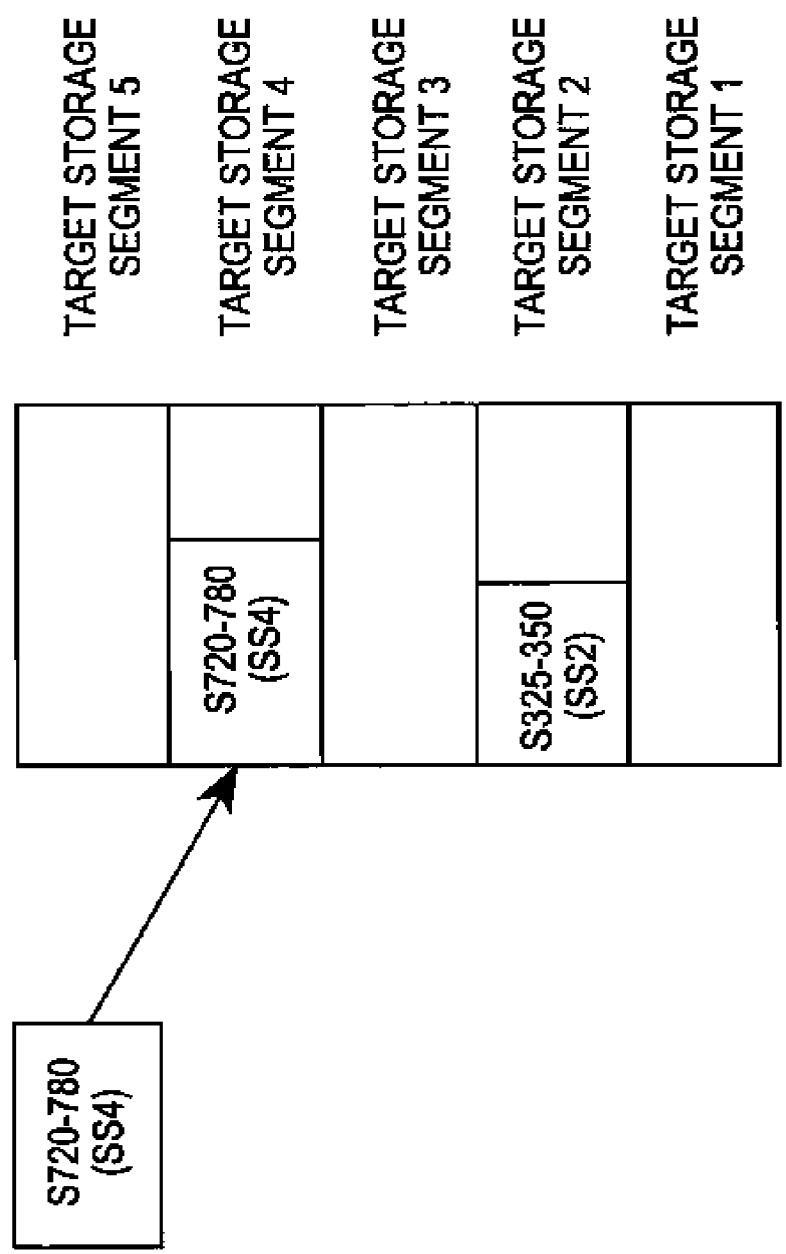
FIG. 8 illustrates a second example using Applicants' method.

Referring now to FIG. 8, in step 540 the method receives updated PIT data that will be used to revise original PIT data encoded at storage addresses S720-S780. Referring to FIG. 3, storage addresses S720-S780 are located in source storage block 375, and source storage block 375 is configured in source storage segment 4. Therefore, (i) equals 4.

In step 560, the method determines if Target Storage Segment 4 comprises sufficient storage capacity to store the original PIT data encoded at storage addresses S720-S780. Having determined that Target Storage Segment 4 does comprise sufficient storage capacity, FIG. 8 shows the original PIT data encoded at storage addresses S720-S780 being copied in step 570 to Target Storage Segment 4.

EXAMPLE III

Figure 9A:
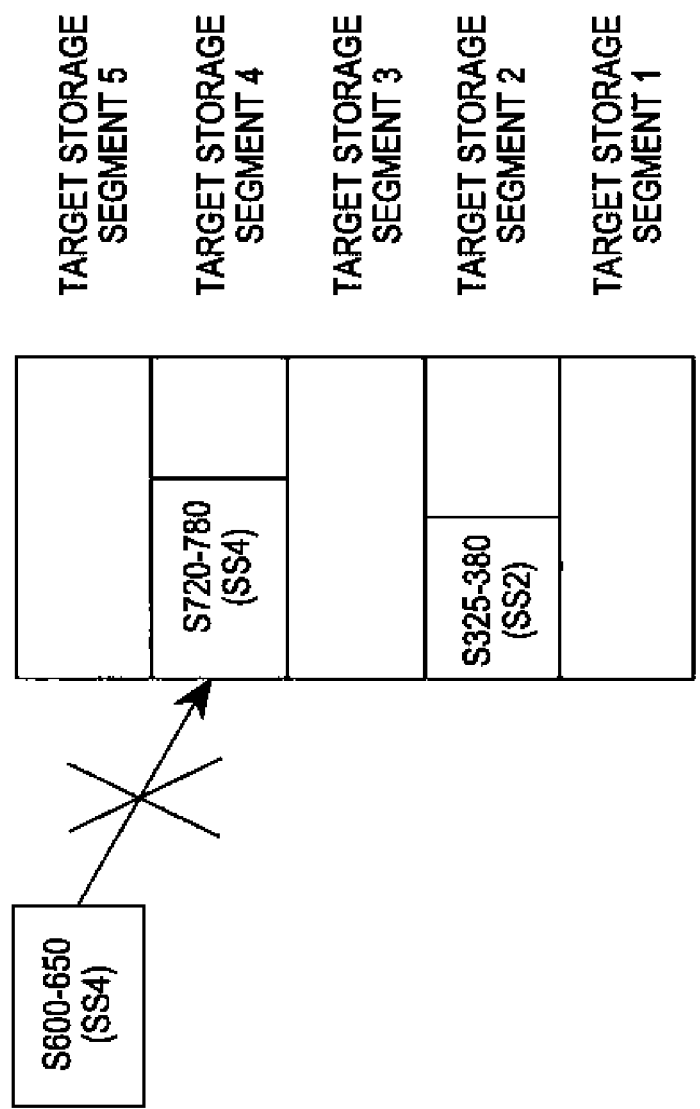
FIG. 9A illustrates a portion of a third example using Applicants' method.

Referring now to FIG. 9A, in step 540 the method receives updated PIT data that will be used to revise original PIT data encoded at storage addresses S600-S650. Referring to FIG. 3, storage addresses S600-S650 are located in source storage block 365, and source storage block 365 is configured in source storage segment 4. Therefore, (i) equals 4.

In step 560, the method determines if Target Storage Segment 4 comprises sufficient storage capacity to store the original PIT data encoded at storage addresses S600-S650. Having determined that Target Storage Segment 4 does not comprise sufficient storage capacity, FIG. 8 shows the original PIT data encoded at storage addresses S600-S650 cannot be copied to Target Storage Segment 4. In step 580, the method determines that 4, the value of (i), is not equal to 5, the value of (B).

Figure 9B:
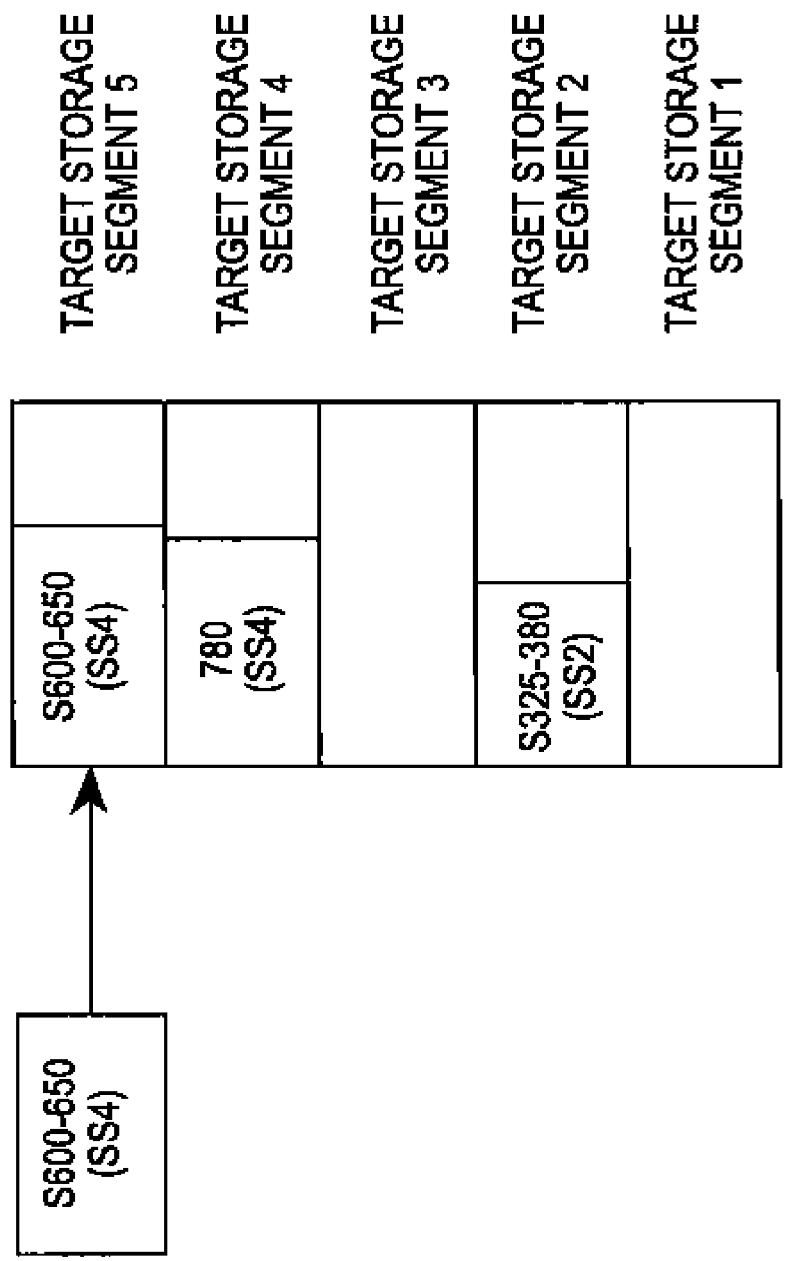
FIG. 9B illustrates a portion of a third example using Applicants' method.

Therefore, in step 590 (i) is incremented by unity, and in step 560 the method determines if Target Storage Segment 5 comprises sufficient storage capacity to store the original PIT data encoded at storage addresses S600-S650. Having determined that Target Storage Segment 5 does comprise sufficient storage capacity, FIG. 9B shows the original PIT data encoded at storage addresses S600-S650 being copied in step 570 to Target Storage Segment 5.

EXAMPLE IV

Referring now to FIG. 10A, in step 540 the method receives updated PIT data that will be used to revise original PIT data encoded at storage addresses S651-S699. Referring to FIG. 3, storage addresses S651-S699 are located in source storage block 365, and source storage block 365 is configured in source storage segment 4. Therefore, (i) equals 4.

In step 560, the method determines if Target Storage Segment 4 comprises sufficient storage capacity to store the original PIT data encoded at storage addresses S651-S699. Having determined that Target Storage Segment 4 does not comprise sufficient storage capacity, FIG. 10A shows the original PIT data encoded at storage addresses S651-S699 cannot be copied to Target Storage Segment 4.

In step 580, the method determines that 4, the value of (j), is not equal to 5, the value of (B). Therefore, in step 590 (j) is incremented by unity, and in step 560 the method determines if Target Storage Segment 5 comprises sufficient storage capacity to store the original PIT data encoded at storage addresses S651-S699. Having determined that Target Storage Segment 5 does not comprise sufficient storage capacity, FIG. 10B shows the original PIT data encoded at storage addresses S651-S699 cannot be copied to Target Storage Segment 5. In step 580, the method determines that 5, the value of (j), is equal to 5, the value of (B).

In step 610, the method sets (j) equal to 3, i.e. (i−1). In step 620 the method determines if Target Storage Segment 3 comprises sufficient storage capacity to store the original PIT data encoded at storage addresses S651-S699. Having determined that Target Storage Segment 3 does comprise sufficient storage capacity, FIG. 10C shows the original PIT data encoded at storage addresses S651-S699 being copied in step 630 to Target Storage Segment 3.

EXAMPLE V

Figure 11:
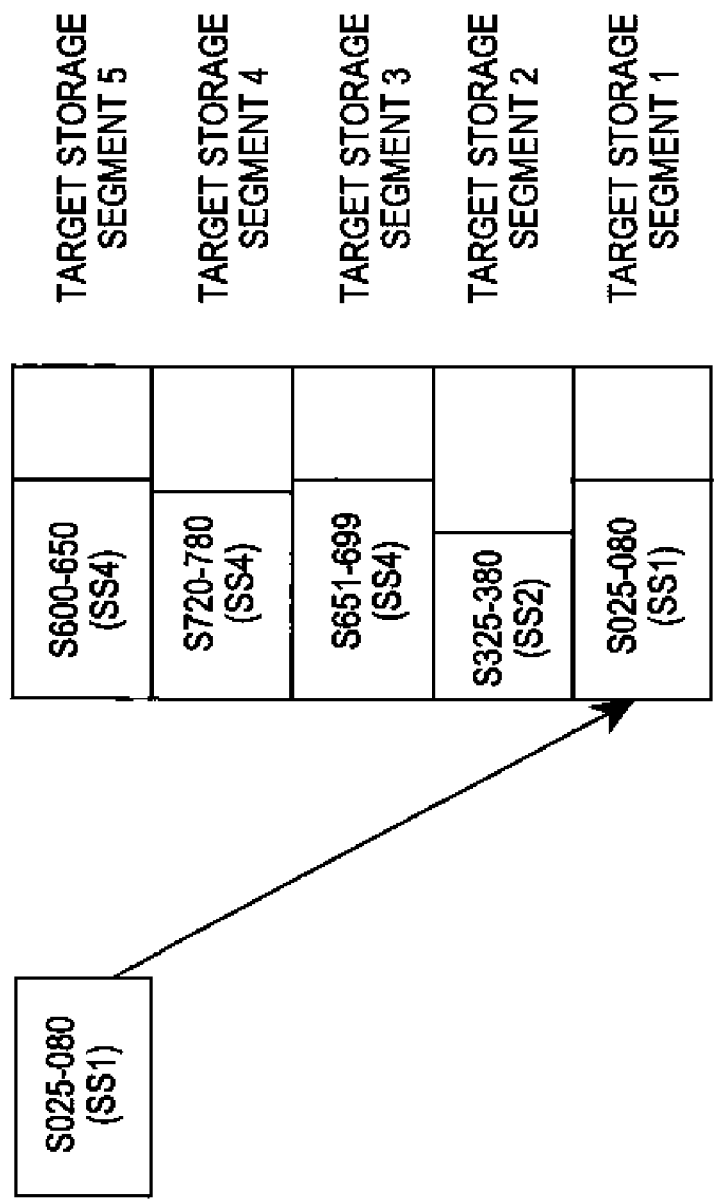
FIG. 11 illustrates a fifth example using Applicants' method.

Referring now to FIG. 11, in step 540 the method receives updated PIT data that will be used to revise original PIT data encoded at storage addresses S025-S080. Referring to FIG. 3, storage addresses S025-S080 are located in source storage block 305, and source storage block 305 is configured in Source Storage Segment 1. Therefore, (i) equals 1.

In step 560, the method determines if Target Storage Segment 1 comprises sufficient storage capacity to store the original PIT data encoded at storage addresses S025-S080. Having determined that Target Storage Segment 1 does comprise sufficient storage capacity, FIG. 11 shows the original PIT data encoded at storage addresses S025-S080 being copied to Target Storage Segment 1.

EXAMPLE VI

Figure 12:
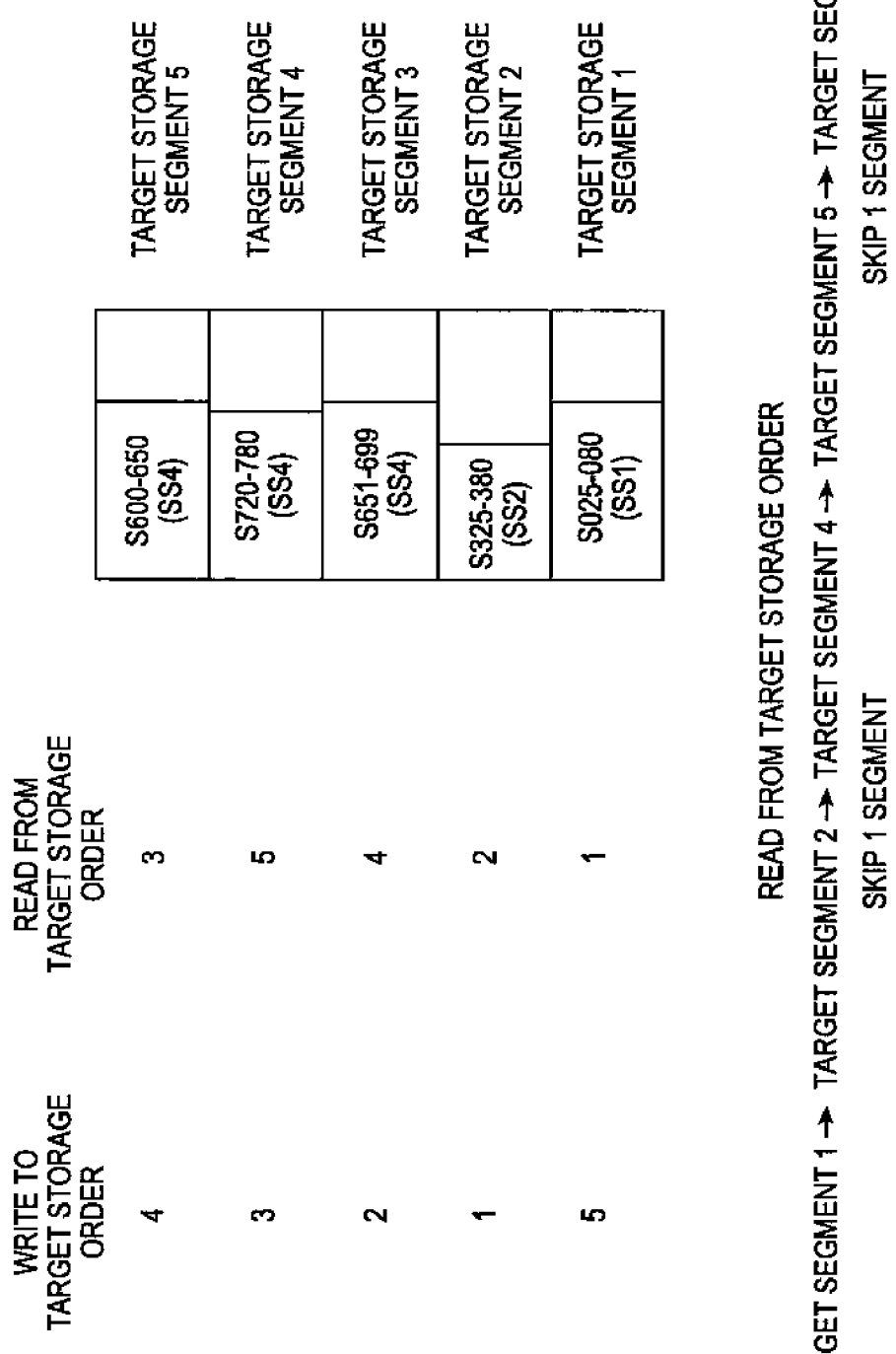
FIG. 12 illustrates a subsequent read operation of original PIT data copied to target storage in examples 1, 2, 3, 4, and 5 using Applicants' method.

Referring now to FIG. 12, when the original PIT data written to Target Data Storage 310 is read, that original PIT data is subsequently read sequentially, i.e. in the order originally written to Source Data Storage 210. Using the original PIT data copied in Examples 1, 2, 3, 4, and 5, the "read order" shown in FIG. 12 is Target Storage Segment 1, Target Storage Segment 2, Target Storage Segment 4, Target Storage Segment 5, and Target Storage Segment 3. This read sequence comprises a total of 2 "skips." By "skips," Applicants mean a read head reads data encoded in a first Target Data Segment, skips a Target Data Segment, and then reads data encoded in a second Target Data Segment.

EXAMPLE VII

Referring now to FIG. 13, using prior art methods to copy original PIT data prior to updating that PIT data, original PIT data is written to target data storage in the same order the updated PIT data is received. FIG. 13 shows that the updated PIT data of Examples 1, 2, 3, 4, and 5, has been written to Target Data Storage 320 in the order received. That original PIT data is subsequently read sequentially, i.e. in the order originally written to Source Data Storage 210.

Using the original PIT data copied to target data storage blocks in Examples 1, 2, 3, 4, and 5, the "read order" shown in FIG. 13 using prior art methods is Target Block 5, Target Block 1, Target Block 3, Target Block 4, and Target Block 2. This prior art read sequence comprises a total of 5 "skips."

Comparing the total number of "skips" of Example VII and VIII demonstrates the utility of Applicants' method. Applicants' method copies original PIT data to Target Data Storage in a pseudo-ordered sequence. Subsequent reads of this pseudo-ordered sequence reduce the distance a read head must travel with respect to reads of original PIT data copied to target data storage blocks using prior art methods. Those skilled in the art will appreciate, that reducing the distance a read head must travel during a subsequent read operation necessarily reduces the time required to perform that subsequent read operation.

In certain embodiments, individual steps recited in FIGS. 5 and 6, may be combined, eliminated, or reordered.

In certain embodiments, Applicants' invention includes instructions, such as instructions 136 (FIG. 1) and/or instructions 146 (FIG. 1), and/or instructions 398, residing in computer readable medium 133, 143, and/or 396, respectively, wherein those instructions are executed by a processor, such as processor 132, 142, and/or 394, respectively, to perform one or more of steps 520, 530, 540, 550, 560, 570, 580, and/or 590, recited in FIG. 5, and/or one or more of steps 610, 620, 630, 640, 650, and/or 660, recited in FIG. 6.

In other embodiments, Applicants' invention includes instructions residing in any other computer program product, where those instructions are executed by a computer external to, or internal to, storage library 100 (FIG. 1), or host computer 390 (FIG. 1), to perform one or more of steps 520, 530, 540, 550, 560, 570, 580, and/or 590, recited in FIG. 5, and/or one or more of steps 610, 620, 630, 640, 650, and/or 660, recited in FIG. 6.

In either case, the instructions may be encoded in a computer readable medium comprising, for example, a magnetic information storage medium, an optical information storage medium, an electronic information storage medium, and the like. By "electronic storage media," Applicants mean, for example and without limitation, one or more devices, such as and without limitation, a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:
1. A method to store point-in-time data, comprising:
    establishing a block size;
    providing source data storage comprising (S) blocks;
    providing target data storage comprising (T) blocks, wherein (T) is less than (S);
    configuring (B) source storage segments and (B) target storage segments, wherein each source storage segment comprises ((S)/(B)) blocks, and wherein each target storage segment comprises ((T)/(B)) blocks;
    receiving updated point-in-time data for original point-in-time data written to an (i)th source storage segment;
    setting (j) equal to (i);
    determining if a (j)th target storage segment comprises available storage capacity to store said original point-in-time data;
    operative if said (j)th target storage segment comprises available storage capacity to store said original point-in-time data, writing said original point-in-time data to said (j)th target storage segment.

2. The method of claim 1, wherein (B) equals (T).

3. The method of claim 1, further comprising:
supplying a data storage library comprising said source data storage and said target data storage;
providing said updated point-in-time data by a host computer to said data storage library;
copying said original point-in-time data by said data storage library to said target data storage.

4. The method of claim 3, further comprising:
supplying a secondary data storage library, wherein said target data storage comprises a magnetic tape storage medium.

5. The method of claim 1, wherein said block size comprises one or more track numbers.

6. The method of claim 1, wherein said block size comprises one or more blockids.

7. The method of claim 1, wherein said (j)th target storage segment does not comprise available storage capacity to store said updated point-in-time data, further comprising:
incrementing (j) by unity;
ascertaining if a (j)th target storage segment comprises available storage capacity to store said original point-in-time data;
operative if said (j)th target storage segment comprises available storage capacity to store said original point-in-time data, copying said original point-in-time data to said (j)th target storage segment.

8. The method of claim 7, wherein said (j)th target storage segment does not comprise available storage capacity to store said updated point-in-time data, further comprising:
determining if (j) equals (B);
operative if (j) does not equal (B), repeating said incrementing step, said ascertaining step, and said copying step.

9. The method of claim 8, wherein (j) equals (B), further comprising:
setting (j) equal to (i−1);
determining if said (j)th target storage segment comprises available storage capacity to store said updated point-in-time data;
operative if said (j)th target storage segment comprises available storage capacity to store said updated point-in-time data, writing said original point-in-time data to said (j)th target storage segment.

10. The method of claim 9, wherein said (j)th target storage segment does not comprise available storage capacity to store said updated point-in-time data, further comprising:
determining if (j) equals 1;
operative if (j) does not equal 1, decrementing (j) by unity;
determining if a (j)th target storage segment comprises available storage capacity to store said original point-in-time data;
operative if a (j)th target storage segment comprises available storage capacity to store said original point-in-time data, writing said original point-in-time data to said (j)th target storage segment.

11. An article of manufacture comprising a source data storage medium comprising (S) blocks, wherein (S) is greater than 1, and a computer readable medium comprising computer readable program code disposed therein to copy updated point-in-time data, wherein said article of manufacture is in communication with a target data storage medium comprising (T) blocks, wherein (T) is less than (S), and wherein each of said (S) blocks and said (T) blocks comprises a same block size, the computer readable program code comprising a series of computer readable program steps to effect:
configuring (B) source storage segments and (B) target storage segments, wherein each source storage segment comprises ((S)/(B)) blocks, and wherein each target storage segment comprises ((T)/(B)) blocks;
receiving updated point-in-time data;
receiving updated point-in-time data for original point-in-time data written to an (i)th source storage segment;
setting (j) equal to (i);
determining if a (j)th target storage segment comprises available storage capacity to store said original point-in-time data;
operative if said (j)th target storage segment comprises available storage capacity to store said original point-in-time data, writing said original point-in-time data to said (j)th target storage segment.

12. The article of manufacture of claim 11, wherein (B) equals (T).

13. The article of manufacture of claim 11, wherein said computer readable program code further comprises a series of computer readable program steps to effect receiving said updated point-in-time data from a host computer.

14. The article of manufacture of claim 13, wherein said target data storage comprises a magnetic tape storage medium.

15. The article of manufacture of claim 11, wherein said (i)th target storage segment does not comprise available storage capacity to store said updated point-in-time data, said computer readable program code further comprises a series of computer readable program steps to effect:
incrementing (j) by unity;
ascertaining if a (j)th target storage segment comprises available storage capacity to store said original point-in-time data;
operative if said (j)th target storage segment comprises available storage capacity to store said original point-in-time data, copying said original point-in-time data to said (j)th target storage segment.

16. The article of manufacture of claim 15, wherein said (j)th target storage segment does not comprise available storage capacity to store said updated point-in-time data, said computer readable program code further comprising a series of computer readable program steps to effect:
determining if (j) equals (B);
operative if (j) does not equal (B), repeating said incrementing step, said ascertaining step, and said copying step.

17. The article of manufacture of claim 16, wherein (j) equals (B), said computer readable program code further comprising a series of computer readable program steps to effect:
setting (j) equal to (i−1);
determining if said (j)th target storage segment comprises available storage capacity to store said updated point-in-time data;
operative if said (j)th target storage segment comprises available storage capacity to store said updated point-in-time data, writing said original point-in-time data to said (j)th target storage segment.

18. The article of manufacture of claim 17, wherein said (j)th target storage segment does not comprise available storage capacity to store said updated point-in-time data, said computer readable program code further comprising a series of computer readable program steps to effect:
determining if (j) equals 1;
operative if (j) does not equal 1, decrementing (j) by unity;

determining if a (j)th target storage segment comprises available storage capacity to store said original point-in-time data;

operative if a (j)th target storage segment comprises available storage capacity to store said original point-in-time data, writing said original point-in-time data to said (j)th target storage segment.

19. A computer program product encoded in computer readable medium wherein said computer program product is usable with a programmable computer processor disposed in a source data storage library to copy updated point-in-time data, wherein said source data storage library further comprises a source data storage medium comprising (S) blocks, wherein (S) is greater than 1, and wherein said source data storage library is in communication with a target data storage medium comprising (T) blocks, wherein (T) is less than (S), and wherein each of said (S) blocks and said (T) blocks comprises a same block size, comprising:

computer readable program code which causes said programmable computer processor to configure (B) source storage segments and (B) target storage segments, wherein each source storage segment comprises ((S)/(B)) blocks, and wherein each target storage segment comprises ((T)/(B)) blocks;

computer readable program code which causes said programmable computer processor to receive updated point-in-time data for original point-in-time data written to an (i)th source storage segment;

computer readable program code which causes said programmable computer processor to set (j) equal to (i);

computer readable program code which causes said programmable computer processor to determine if a (j)th target storage segment comprises available storage capacity to store said original point-in-time data;

computer readable program code which, if said (j)th target storage segment comprises available storage capacity to store said original point-in-time data, causes said programmable computer processor to write said original point-in-time data to said (j)th target storage segment.

20. The computer program product of claim 19, further comprising computer readable program code which causes said programmable computer processor to receive said updated point-in-time data from a host computer.

21. The computer program product of claim 19, wherein said target data storage comprises a magnetic tape storage medium.

22. The computer program product of claim 19, wherein said (j)th target storage segment does not comprise available storage capacity to store said updated point-in-time data, further comprising:

computer readable program code which causes said programmable computer processor to increment (j) by unity;

computer readable program code which causes said programmable computer processor to ascertain if a (j)th target storage segment comprises available storage capacity to store said original point-in-time data;

computer readable program code which, if said (j)th target storage segment comprises available storage capacity to store said original point-in-time data, causes said programmable computer processor to copy said original point-in-time data to said (j)th target storage segment.

23. The computer program product of claim 19, wherein said (j)th target storage segment does not comprise available storage capacity to store said updated point-in-time data, further comprising:

computer readable program code which, if (j) is less than (B), causes said programmable computer processor to:

increment (j) by unity;

ascertain if a (j)th target storage segment comprises available storage capacity to store said original point-in-time data;

if said (j)th target storage segment comprises available storage capacity to store said original point-in-time data, copy said original point-in-time data to said (j)th target storage segment.

24. The computer program product of claim 23, wherein (j) equals (B), further comprising:

computer readable program code which causes said programmable computer processor to set (j) equal to (i−1);

computer readable program code which causes said programmable computer processor to determine if said (j)th target storage segment comprises available storage capacity to store said updated point-in-time data;

computer readable program code which causes said programmable computer processor to execute operative if said (j)th target storage segment comprises available storage capacity to store said updated point-in-time data, writing said original point-in-time data to said (j)th target storage segment.

25. The computer program product of claim 24, wherein said (j)th target storage segment does not comprise available storage capacity to store said updated point-in-time data, further comprising:

computer readable program code which causes said programmable computer processor to determine if (j) equals 1;

computer readable program code which, if (j) does not equal 1, causes said programmable computer processor to:

decrement (j) by unity;

determine if a (j)th target storage segment comprises available storage capacity to store said original point-in-time data;

operative if a (j)th target storage segment comprises available storage capacity to store said original point-in-time data, write said original point-in-time data to said (j)th target storage segment.

\* \* \* \* \*